United States Patent [19]
Lu

[11] Patent Number: 5,779,309
[45] Date of Patent: Jul. 14, 1998

[54] SWIVEL PLATE DEVICE

[76] Inventor: Cheng-Ho Lu, 56 Min Sheng Street, Fengyuan, Taichung Hsien, Taiwan, 420

[21] Appl. No.: 921,717
[22] Filed: Sep. 2, 1997
[51] Int. Cl.⁶ .................. A47C 1/02; A47B 91/00
[52] U.S. Cl. .................. 297/344.26; 248/349.1
[58] Field of Search .............. 248/289.31, 349.1;
277/344.21, 344.26, 337, 463.1, 256.12,
137, 263.1, 263.2

[56] References Cited

U.S. PATENT DOCUMENTS

| | | |
|---|---|---|
| 3,199,826 | 8/1965 | Miller et al. |
| 4,659,050 | 4/1987 | Tabayashi . |
| 4,705,256 | 11/1987 | Hofrichter . |
| 4,844,543 | 7/1989 | Ochiai . |
| 5,622,343 | 4/1997 | Morton . |

Primary Examiner—Milton Nelson, Jr.

[57] ABSTRACT

A swivel plate device has a base plate, a rotating plate disposed on the base plate, and a cover covering the rotating plate. The base plate has a center hole, an annular groove, an annular protuberance, and positioning holes. A chain-shaped ring has round holes. A plurality of balls are inserted in the round holes. The rotating plate has a central through hole, a plurality of oblong holes, an annular recess, an annular protrusion, an annular channel and a post. A rivet passes through an annular bearing, the central through hole, and the center hole. A pillar is disposed on the rivet. A spring has a first end hook hooking the pillar and a second end hook hooking the post. A rim of the cover is inserted in the annular recess. The chain-shaped ring is inserted in the annular groove and the annular channel.

1 Claim, 5 Drawing Sheets

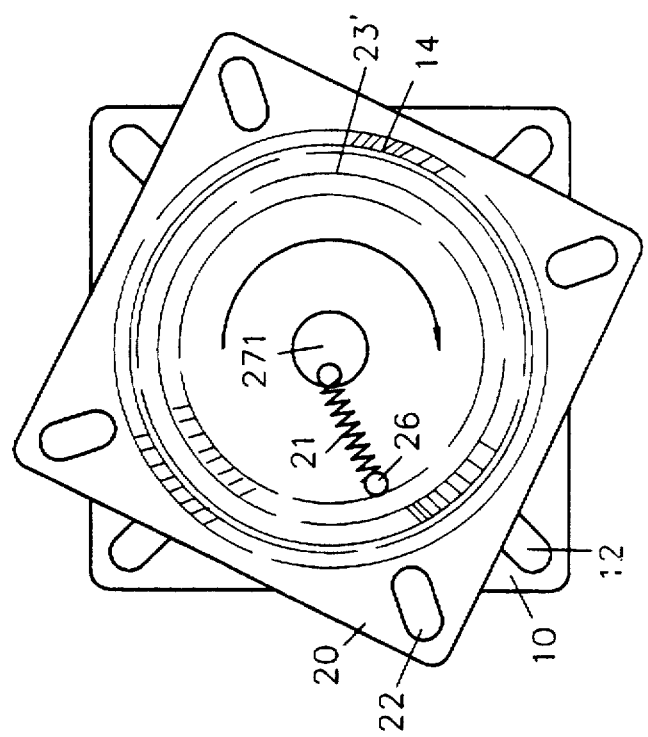
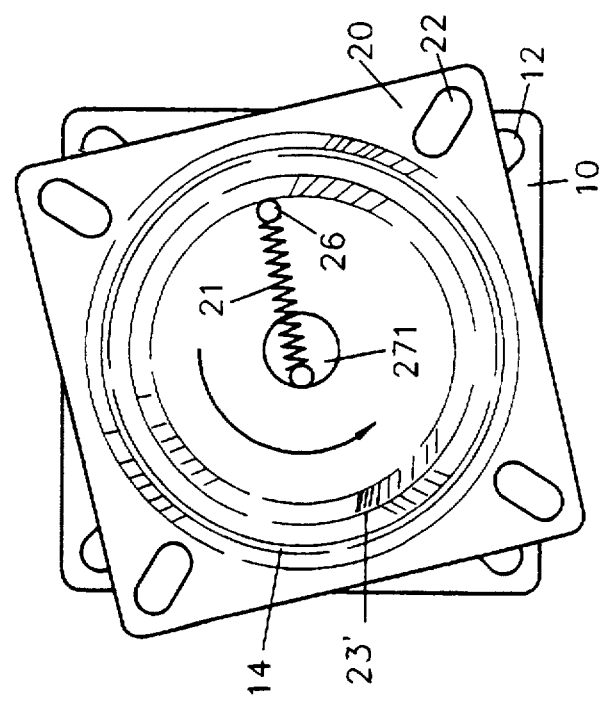

SWIVEL PLATE DEVICE

BACKGROUND OF THE INVENTION

This invention relates to a swivel plate device, and more particularly to a swivel plate device for a chair which can rotate three hundred and sixty degrees.

A traditional swivel plate device can rotate three hundred and sixty degrees. However, the traditional swivel plate device cannot return to its original position after the traditional swivel plate device is rotated.

SUMMARY OF THE INVENTION

An object of this invention is to provide a rotating plate which can rotate three hundred and sixty degrees clockwisely.

Another object of this invention is to provide a rotating plate which can rotate three hundred and sixty degrees counterclockwisely.

Another object of this invention is to provide a swivel plate device which has a rotating plate to recover an original position of the rotating plate after the rotating plate is rotated.

BRIEF DESCRIPTION OF THE DRAWINGS

FIG. 6 is an elevational schematic view showing another clockwise rotation of the rotating plate;

FIG. 7 is an elevational schematic view showing a counterclockwise rotation of the rotating plate.

DETAILED DESCRIPTION OF THE INVENTION

Figure 1:
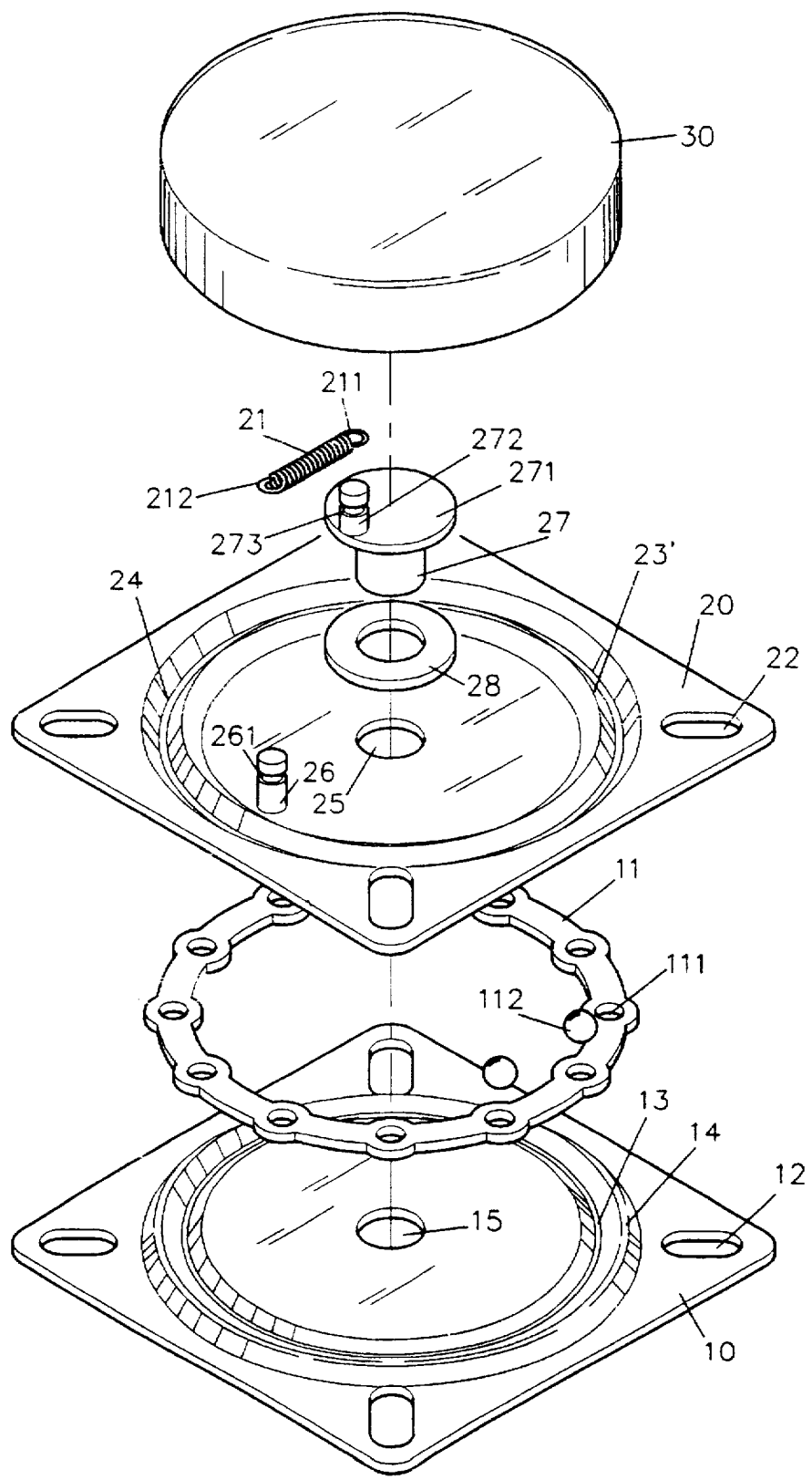
FIG. 1 is a perspective exploded view of a swivel plate device of a preferred embodiment in accordance with this invention.
Figure 2:
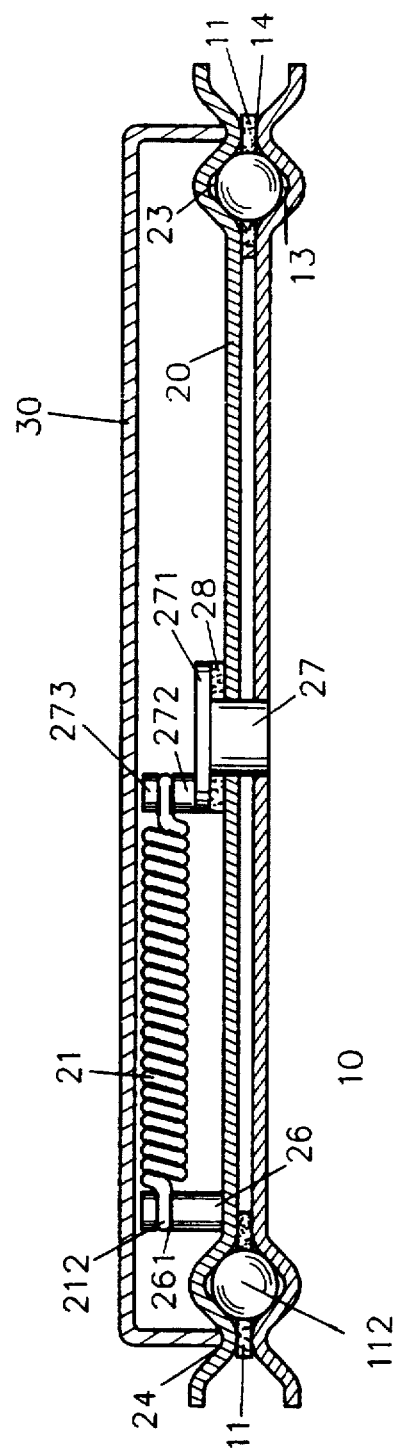
FIG. 2 is a sectional assembly view of a swivel plate device of a preferred embodiment in accordance with this invention.
Figure 3:
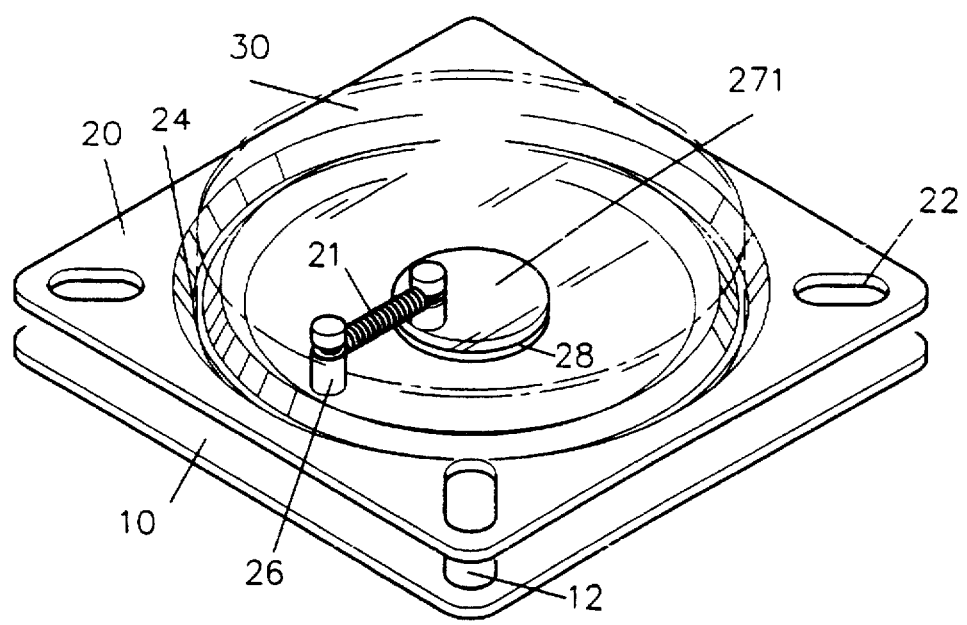
FIG. 3 is a perspective assembly view of FIG. 1.

Referring to FIGS. 1 to 3, a swivel plate device comprises a base plate 10, a rotating plate 20 disposed on the base plate 10, a chain-shaped ring 11 disposed between the base plate 10 and the rotating plate 20, and a cover 30 covering the rotating plate 20. The base plate 10 has a center hole 15, an annular groove 13, an annular protuberance 14, and a plurality of positioning holes 12. The chain-shaped ring 11 has a plurality of round holes 111. A plurality of steel balls 112 are inserted in the round holes 111. The rotating plate 20 has a central through hole 25, a plurality of oblong holes 22, an annular recess 24 formed on an upper face of the rotating plate 20, an annular protrusion 23' formed on the upper face of the rotating plate 20, an annular channel 23 formed on a lower face of the rotating plate 20, and a post 26 disposed on the rotating plate 20. A periphery groove 261 is formed on the post 26. A rivet 27 passes through an annular bearing 28, the central through hole 25, and the center hole 15. The rivet 27 has a head 271. A pillar 272 is disposed on the head 271 of the rivet 27. A periphery recess 273 is formed on the pillar 272. A spring 21 has a first end hook 211 hooking the periphery recess 273 and a second end hook 212 hooking the periphery groove 261. A rim of the cover 30 is inserted in the annular recess 24. The chain-shaped ring 11 is inserted in the annular groove 13 and the annular channel 23.

Figure 4:
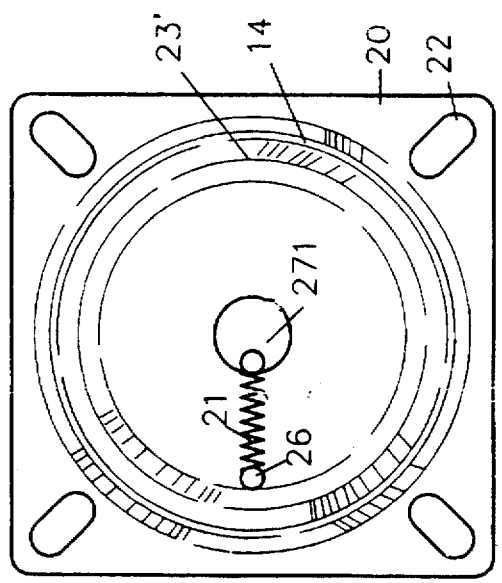
FIG. 4 is an elevational schematic view showing an original position of the swivel plate device.

Referring to FIG. 4, the swivel plate device is in its original position.

Figure 5:
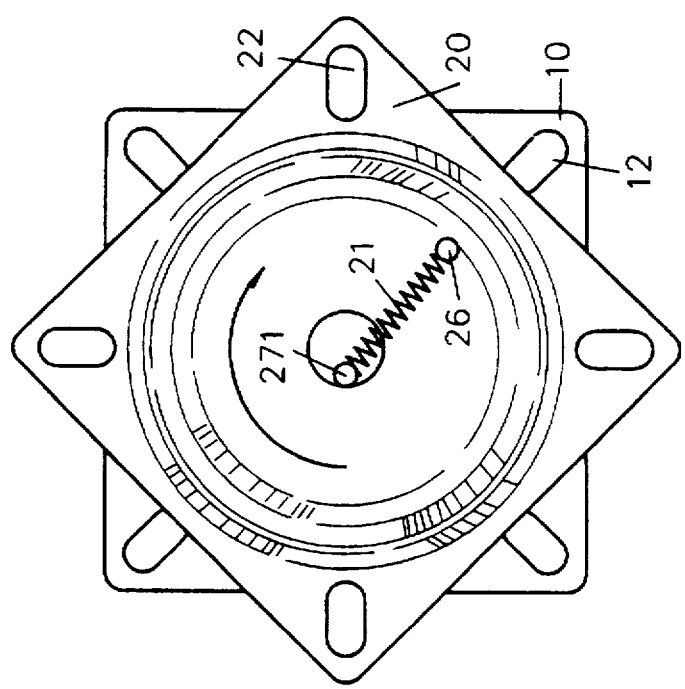
FIG. 5 is an elevational schematic view showing a clockwise rotation of the rotating plate.

Referring to FIGS. 5 and 6, the rotating plate 20 is rotated clockwisely.

Referring to FIG. 7, the rotating plate 20 is rotated counterclockwisely.

No matter whether the rotating plate 20 is rotated clockwisely or counterclockwisely, the spring 21 will force the rotating plate 20 to recover its original position.

I claim:

1. A swivel plate device comprises:
    a base plate, a rotating plate disposed on the base plate, a chain-shaped ring disposed between the base plate and the rotating plate, and a cover covering the rotating plate,
    the base plate having a center hole, an annular groove, an annular protuberance, and a plurality of positioning holes,
    the chain-shaped ring having a plurality of round holes,
    a plurality of steel balls inserted in the round holes,
    the rotating plate having a central through hole, a plurality of oblong holes, an annular recess formed on an upper face of the rotating plate, an annular protrusion formed on the upper face of the rotating plate, an annular channel formed on a lower face of the rotating plate, and a post disposed on the rotating plate,
    a periphery groove formed on the post,
    a rivet passing through an annular bearing, the central through hole, and the center hole,
    a pillar disposed on a head of the rivet,
    a periphery recess formed on the pillar,
    a spring having a first end hook hooking the periphery recess and a second end hook hooking the periphery groove,
    a rim of the cover inserted in the annular recess, and
    the chain-shaped ring inserted in the annular groove and the annular channel.

\* \* \* \* \*